(12) United States Patent
Yakita et al.

(10) Patent No.: US 7,423,687 B2
(45) Date of Patent: Sep. 9, 2008

(54) IMAGE-TAKING LENS SYSTEM AND IMAGE-TAKING SYSTEM

(75) Inventors: Shinichiro Yakita, Tochigi (JP); Yasuyuki Tomita, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 735 days.

(21) Appl. No.: 10/976,854

(22) Filed: Nov. 1, 2004

(65) Prior Publication Data

US 2005/0094026 A1 May 5, 2005

(30) Foreign Application Priority Data

Nov. 4, 2003 (JP) ............................... 2003-375037

(51) Int. Cl.
*H04N 5/225* (2006.01)
(52) U.S. Cl. ..................................... 348/360
(58) Field of Classification Search ................. 348/360, 348/208
See application file for complete search history.

(56) References Cited

U.S. PATENT DOCUMENTS 5,758,206 A 5/1998 Imaoka ......................... 396/80
6,002,528 A 12/1999 Tomita ........................ 359/684
6,282,032 B1 8/2001 Tomita ........................ 359/687
2002/0171750 A1 11/2002 Kato ........................... 348/345

FOREIGN PATENT DOCUMENTS

| EP | 1 220 001 A1 | 7/2002 |
| EP | 1220001 A1 * | 7/2002 |
| JP | 2-262113 | 10/1990 |
| JP | 2840283 B2 | 12/1998 |

* cited by examiner

*Primary Examiner*—Vu Le
*Assistant Examiner*—Joel Fosselman
(74) *Attorney, Agent, or Firm*—Fitzpatrick, Cella, Harper & Scinto

(57) ABSTRACT

Disclosed is an image-taking lens system, with which the optimum image-forming position can be detected accurately regardless of whether an auxiliary lens system is inserted or not, and with little blurring of the image on the output screen during wobbling. The image-taking lens system includes a light amount adjustment stop; a relay lens unit having an image-forming action; a wobbling lens unit arranged within the relay lens unit, the wobbling lens unit being driven by an amplitude in an optical axis direction; and an auxiliary lens system which can be inserted into and removed from the relay lens unit, the auxiliary lens system shifting a focal length of the overall image-taking lens system. The amplitude by which the wobbling lens unit is driven is set depending on whether the auxiliary lens system is inserted or removed.

10 Claims, 5 Drawing Sheets

IMAGE-TAKING LENS SYSTEM AND IMAGE-TAKING SYSTEM

BACKGROUND OF THE INVENTION

1. Field of the Invention

The present invention relates to an image-taking lens system and an image-taking system, such as an image-taking lens which is favorable for television cameras or video cameras, for example, and in particular to an image-taking lens system and an image-taking system which are favorable for a plurality of image-taking apparatuses with different image sizes or an image-taking apparatus which can switch between a plurality of image sizes, and which are suitable for auto-wobbling to search the in-focus point by wobbling a portion of a lens unit arranged further to the image side than a light amount adjustment-stop.

2. Background of the Invention

In recent years, as camera operators and image-taking conditions for image-taking lenses for television recordings diversify, the requirements regarding operability, convenience and maneuverability of such lenses are becoming more stringent. Accordingly, the importance of image-taking lenses having an automatic focusing adjustment (AF, autofocus) function is increasing.

Ordinarily, due to the need to ensure the operability and maneuverability of image-taking lenses such as lenses for TV cameras, it is not appropriate to use an autofocus of the external measurement method using infrared light or the like, and which has to be provided with a distance detecting system which is separate from the image-forming system.

In video cameras or the like, the so-called "hill-climbing AF" method is common, in which the direction approaching the best image-forming position is detected from the video signal, and a focus lens unit is moved in this direction up to a suitable position.

FIG. 3 shows the optical structure of a zoom lens having such a hill-climbing AF function. In FIG. 3, I denotes a first lens unit which can be moved in an optical axis direction for performing focusing, II denotes a second lens unit which can be moved during zooming, III denotes a third lens unit for correcting the movement of the image-forming position during zooming, SP denotes a light amount adjustment stop, IV denotes a fourth lens unit performing an image-forming action, GB denotes a glass block such as a color separation optical system, Wo denotes a wobbling lens unit, and IG denotes an image-taking surface (CCD surface or film surface).

In order to determine with this setup whether the best image-forming position is located frontward or rearward in the optical axis direction with respect to the image-taking surface, the video signal is detected while a portion of the optical system is finely driven by an amplitude (wobbling) in the optical axis direction, and based on this signal, the focus lens unit is moved such that the optimum focus is attained on the image-taking surface. In order to allow driving of the wobbling lens unit with a small driving force and to simplify its structure, it is common to make the lens diameters of the wobbling lens unit small, and to perform the wobbling with a portion of a lens unit which is further on the image side than the light amount adjustment stop, which is fixed during zooming. On the one hand, the image-forming position should be shifted with a suitable amplitude that is possible to determine a direction as the system and a peak in video signal, in order to detect gradients in the video signal more accurately, and the amplitude should be restricted, so that the image on the output screen does not become blurry due to the amplitude driving of the wobbling lens units.

Now, there are pluralities of image sizes in TV cameras, and various kinds of camera bodies are arranged in accordance with the individual image sizes. Also, image-taking lenses need to be designed exclusively in accordance with each image size and camera body. When an image-taking lens for large image sizes is used on a camera body having a small image-size, then it is not possible to obtain the same field angle, and the focal length becomes too longer than a diagonal length in the image size. That is to say, the focal length will be substantially shifted to the telephoto side.

On the other hand, there are camera systems which can be switched between screen aspect ratios of 16:9 and 4:3 by making the left and right portions of screens with a screen aspect ratio of 16:9 into imperceptibility portion (by cutting the left and right portions of screens) to attain a screen aspect ratio of 12:9=4:3. When switching from 16:9 to 4:3, the image-taking field angle is narrowed due to the reduction of the image size. In order to solve this problem, for example Japanese Patent No. 2840283 proposes an image-taking lens system, in which a favorable optical performance is maintained in spite of large changes in the field angle by mounting an auxiliary lens system which can be inserted into the optical system in order to shift the focal length to the wide-angle side, for example, when the image-taking lens mounted to a camera body having a large image size is remounted to a camera body having a small image size.

Incidentally, even though the lens system of Japanese Patent No. 2840283, in which a portion of a relay lens unit whose function is an image-forming action and which is arranged further on the image side than the light amount adjustment stop is wobbled, is characterized in that it achieves a smaller size and a lighter weight, inserting and removing an auxiliary lens system restricts the axial rays with a member different from the light amount adjustment stop, so that the effective F number is different even for the same diameters of the light amount adjustment stop. That is to say, if an index of the F number is marked on the ring of the light amount adjustment stop, or if the F number is calculated using a signal from a position detection unit such as a potentiometer detecting the diameter of the light amount adjustment stop, then the effective F number will be different from the indicated F number or the F number value calculated from the signal. Due to this change in the effective F number, the depth of focus changes, so that it becomes difficult to detect the best image-forming position accurately with the same amplitude of the wobbling lens unit when the auxiliary lens system is removed or when it is inserted, or there is the problem that the image on the output screen becomes blurry.

SUMMARY OF THE INVENTION

It is thus an object of the present invention to provide an image-taking lens system and an image-taking system, with which the optimum image-forming position can be detected accurately regardless of whether an auxiliary lens system is inserted or not, and with no blurring of the image on the output screen during wobbling.

The present invention provides an image-taking lens system and an image-taking system with the following structure:

An image-taking lens system according to the present invention includes a relay lens unit having an image-forming action; a wobbling lens unit arranged within the relay lens unit, the wobbling lens unit being driven by an amplitude in an optical axis direction; and an auxiliary lens system which can be inserted into and removed from the relay lens unit, the auxiliary lens system shifting a focal length of the overall image-taking lens system. The amplitude amount of by which the wobbling lens unit is set on the basis of a state which the auxiliary lens system is inserted or removed.

An image-taking system according to the present invention includes an image-taking apparatus and an image-taking lens according, which is mounted on the image-taking apparatus.

Other features and advantages of the present invention will be apparent from the following description taken in conjunction with the accompanying drawings, in which like reference characters designate the same or similar parts through the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a diagram showing the optical structure of a zoom lens of an embodiment (Numerical Example 1) of the present invention for the case that the auxiliary lens system is not inserted with respect to the zoom lens. FIG. 1B is a diagram showing the optical structure of a zoom lens of an embodiment (Numerical Example 2) of the present invention for the case that the auxiliary lens system is inserted with respect to the zoom lens of Numerical Example 1.

FIG. 2A is a diagram showing the optical structure of the zoom lens according to Numerical Example 1 for the case that the auxiliary lens system is not inserted with respect to the zoom lens. FIG. 2B is a diagram showing the optical structure of the zoom lens according to Numerical Example 2 for the case that the auxiliary lens system is inserted with respect to the zoom lens of Numerical Example 1.

DETAILED DESCRIPTION OF THE PREFERRED EMBODIMENTS

Figure 1A:
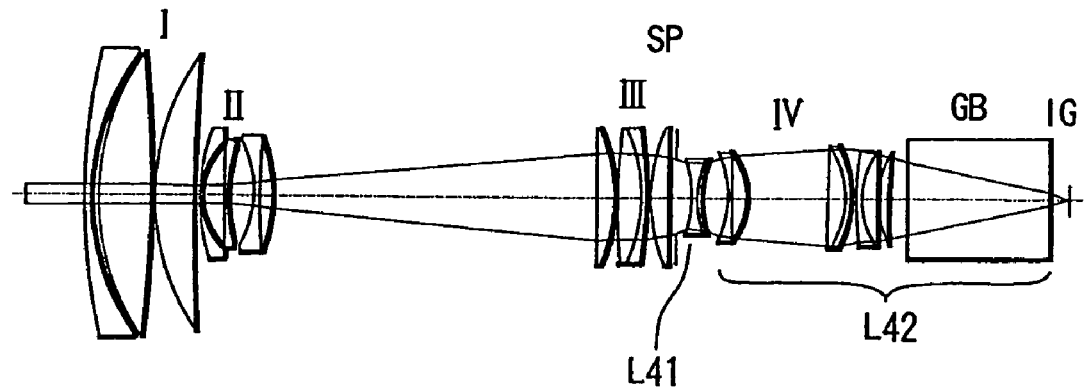
FIGS. 1A and 1B are diagrams showing the optical structure of a zoom lens of the present invention for the case that a wobbling lens unit is arranged in an object side than a space in which an auxiliary lens system is inserted or removed.
Figure 1B:
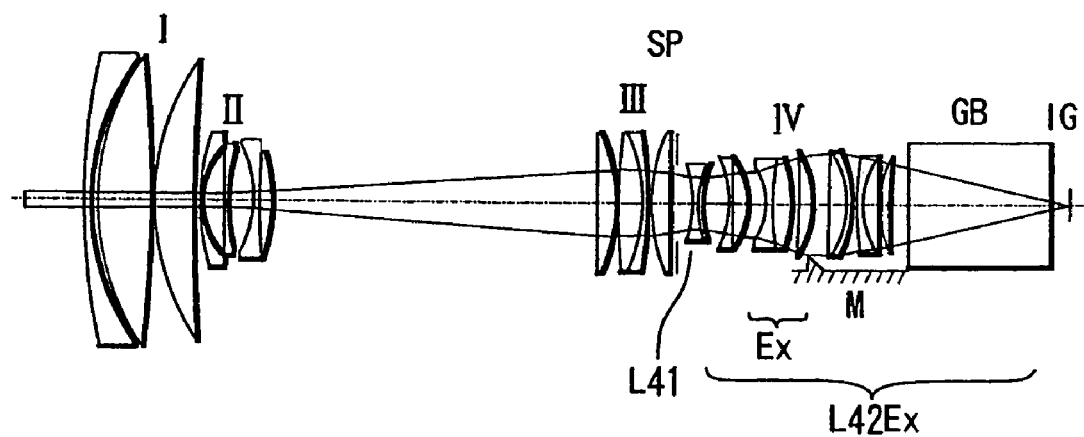

Referring to the accompanying drawings, the following is a detailed description of an image-taking lens system in accordance with an embodiment of the present invention. FIGS. 1A, 1B, 2A and 2B show the optical structure of an image-taking lens having an autofocus function and an insertion/removal state of an insertable auxiliary lens system which shifts the focal length of the overall optical system according to the present invention to the wide-angle side. FIGS. 1A and 1B are diagrams showing the optical structure of a zoom lens of the present invention for the case that a wobbling lens unit is arranged in an object side than a space in which the auxiliary lens system is inserted or removed.

FIG. 1A is a diagram showing the optical structure of a zoom lens of the present embodiment (Numerical Example 1) for the case that the auxiliary lens system is not inserted with respect to the zoom lens. Also FIG. 1B is a diagram showing the optical structure of a zoom lens of the present embodiment (Numerical Example 2) for the case that the auxiliary lens system is inserted with respect to the zoom lens of Numerical Example 1.

Figure 2A:
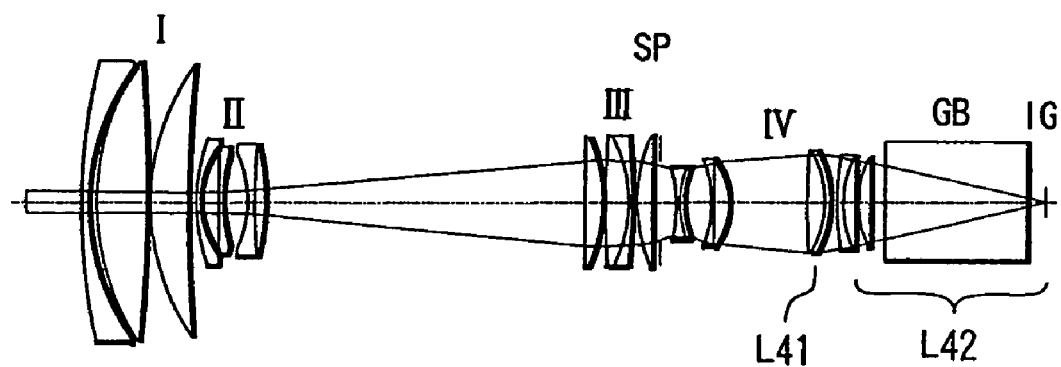
FIGS. 2A and 2B are diagrams showing the optical structure of a zoom lens of the present invention for the case that a wobbling lens unit is arranged in an image side than a space in which the auxiliary lens system is inserted or removed.
Figure 2B:
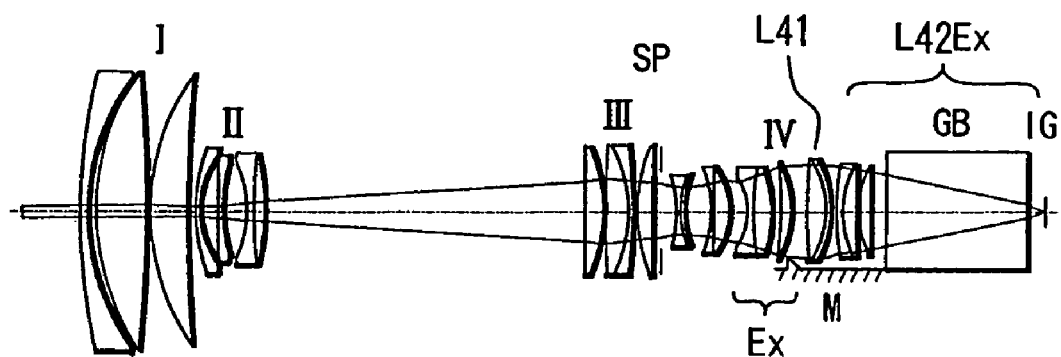
Figure 3:
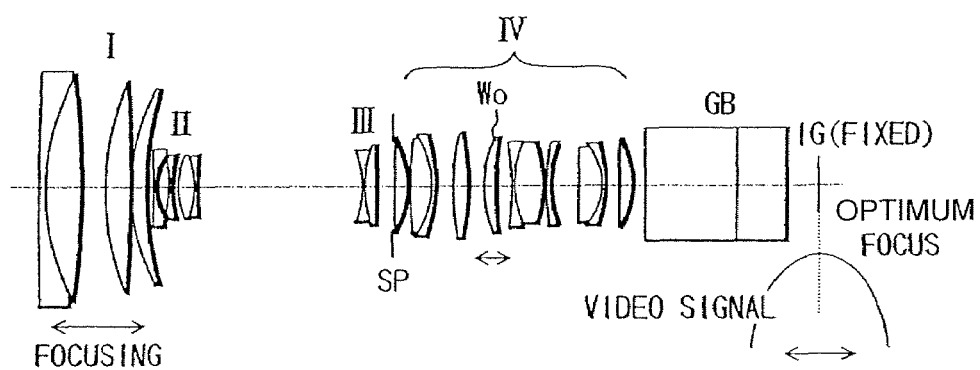
FIG. 3 shows the optical structure of a zoom lens having a so-called hill-climbing autofocus function.

Moreover, FIGS. 2A and 2B are diagrams showing the optical structure of a zoom lens of the present invention for the case that a wobbling lens unit is arranged in an image side than a space in which the auxiliary lens system is inserted or removed. FIG. 2A is a diagram showing the optical structure of the zoom lens according to Numerical Example 1 for the case that the auxiliary lens system is not inserted with respect to the zoom lens. FIG. 2B is a diagram showing the optical structure of the zoom lens according to Numerical Example 2 for the case that the auxiliary lens system is inserted with respect to the zoom lens of Numerical Example 1.

In order from the object side in these diagrams, I denotes a first lens unit for performing focusing, II denotes a second lens unit which can be moved during zooming, III denotes a third lens unit for correcting the movement of the image-forming position during zooming, IV denotes a fourth lens unit performing an image-forming action, M denotes a member holding lenses, GB denotes a glass block such as a color separation prism, IG denotes an image-taking surface, and SP denotes a light amount adjustment stop. The first lens unit I and the fourth lens unit IV are fixed during zooming. Moreover, the fourth lens unit IV includes a freely insertable an auxiliary lens unit Ex, a wobbling lens unit L41, and, when the auxiliary lens unit Ex is removed, a lens unit L42 extending from the wobbling lens unit to the image-taking surface on the image side, or, when the auxiliary lens unit Ex is inserted, a lens unit L42Ex extending from the wobbling lens unit to the image-taking surface on the image side.

FIG. 1B shows a lens system where the auxiliary lens unit Ex is inserted into the image-taking lens system in FIG. 1A, in which the wobbling lens unit L41 is provided further on the object side than the auxiliary lens unit Ex. FIG. 2B shows a lens system where the auxiliary lens unit Ex is inserted into the image-taking lens system in FIG. 2A, in which the wobbling lens unit L41 is provided further on the image side than the auxiliary lens unit Ex. It should be noted that the image-taking lens of the present embodiment can be mounted exchangeably to a TV camera or a video camera (image-taking device) not shown in the drawings, thus constituting an image-taking system.

In the image-taking lens of the present embodiment, a direction determination signal for autofocusing is obtained at the image-taking surface, by wobbling the lens unit L41 in the direction of the optical axis. Based on this obtained signal, the focus lens unit is driven to the optimum focus position. In this situation, in order to obtain the direction determination signal for autofocusing at the imaging surface, it is necessary to shift the back focus for suitable amounts by wobbling.

Here, the shift amount of the back focus due to wobbling is $\Delta sk$, the lateral magnification of the lens unit L41 is $\beta 1$, the lateral magnification of the lens unit L42 or L42Ex is $\beta 2$, the diameter of the permissible circle of confusion is $\sigma$, and the effective F number when the lens unit Ex is not inserted is FNO. Considering that the image on the output screen should not blur during wobbling, the depth of focus is taken as a criterion regarding the shift amount $\Delta sk$ of the back focus. Total of the amplitude of the depth of focus represents by the twice of the product of the diameter of the permissible circle of confusion α and the effective F number. The depth of focus is proportional to the permissible circle of confusion α and to the effective F number FNO, so that the amplitude Δx of the wobbling lens unit, that is, the lens unit L41, can be roughly expressed by the following Expression (3):

$$\Delta x = \frac{\Delta s_k}{(1-\beta_1^2)\cdot\beta_2^2} \qquad (3)$$
$$\propto \frac{\sigma\cdot F_{NO}}{\beta_2^2}$$

In the case of the following Expression (1), $$W_{IN} = \frac{\delta\cdot F}{K^2} W_{OUT} \qquad (1)$$

that is, if the wobbling lens unit is provided further on the object side than the auxiliary lens unit, then exchanging the image-taking apparatus changes the permissible circle of confusion σ by a factor of δ compared to before the exchange. Moreover, inserting the auxiliary lens system changes the effective F number FNO by a factor of F compared to before the insertion. Here, $W_{IN}$ is amplitude of wobbling lens unit when the auxiliary lens system is inserted, and $W_{OUT}$ is an amplitude of wobbling lens unit when the auxiliary lens system is not inserted.

Also, inserting the auxiliary lens system changes the β2 of the lens unit L42Ex and the β2 of the lens unit L42 by a factor of K, so that when inserting the auxiliary lens system, the amplitude of the wobbling lens unit is increased by a factor of $(\delta\cdot F\cdot K^{-2})$ compared to before the insertion.

In the case of the following Expression (2), $$W_{IN} = \delta\cdot F\cdot W_{OUT} \qquad (2)$$

that is, if the wobbling lens unit is provided further on the image side than the auxiliary lens unit, then exchanging the image-taking apparatus changes the permissible-circle of confusion a by a factor of δ compared to before the exchange. Moreover, inserting the auxiliary lens system changes the effective F number FNO by a factor of F compared to before the insertion. Also, inserting the auxiliary lens system does not affect the β2 of the lens unit L42Ex and the β2 of the lens unit L42, so that according to Expression (3), when inserting the auxiliary lens system, the amplitude of the wobbling lens unit is increased by a factor of (δ·F) compared to before the insertion.

As shown in FIGS. 1B and 2B, in the insertion of the auxiliary lens unit Ex, the axial rays are not confined at the light amount adjustment stop, but are confined at the member M holding the lenses. The change factor F of the effective F number accompanying an insertion of the auxiliary lens system depends on the confinement conditions of the rays determining the effective F number, such as the effective diameter of the optical system, so that the change factor F differs from optical system to optical system. By appropriately confining the rays determining the effective F number with the lens member M holding the lenses, the optical system further to the image side than the auxiliary lens system can be made small and light. Moreover, by appropriately confining the rays determining the effective F number and narrowing the range of aberration correction, it is possible to maintain a favorable optical performance regardless of whether the auxiliary lens system is inserted or not.

Table 1 below shows a numerical example of the image-taking lens shown in FIGS. 1A and 2A, and Table 2 below shows a numerical example of the image-taking lens shown in FIGS. 1B and 2B. FIGS. 5A, 5B, 6A, and 6B show aberration charts for the wide-angle end (A) and the telephoto end (B) of these numerical examples.

In Tables 1 and 2, ri denotes the radius of curvature (in mm) of the i-th surface counted from the object side, di denotes the distance (in mm) between the i-th surface and the (i+1)th surface, and ni and vi respectively denote the refractive index and the Abbe number of the medium between the i-th surface and the (i+1)th surface, counted from the object side.

TABLE 1 f = 11.28 Fno = 1: 1.6~1.8 IMAGE SIZE φ 11

| | | | | | | | |
|---|---|---|---|---|---|---|---|
| r1 = | 201.367 | d1 = | 3.09 | n1 = 1.68893 | v1 = 31.1 |
| r2 = | 79.603 | d2 = | 1.65 | | |
| r3 = | 81.681 | d3 = | 18.99 | n2 = 1.48749 | v2 = 70.2 |
| r4 = | −434.228 | d4 = | 0.21 | | |
| r5 = | 79.677 | d5 = | 14.09 | n3 = 1.51633 | v3 = 64.2 |
| r6 = | 581.252 | d6 = | Variable | | |
| r7 = | 70.957 | d7 = | 1.65 | n4 = 1.77250 | v4 = 49.6 |
| r8 = | 29.208 | d8 = | 6.76 | | |
| r9 = | −2104.508 | d9 = | 1.51 | n5 = 1.77250 | v5 = 49.6 |
| r10 = | 59.821 | d10 = | 8.57 | | |
| r11 = | −32.422 | d11 = | 1.51 | n6 = 1.77250 | v6 = 49.6 |
| r12 = | 345.764 | d12 = | 4.32 | n7 = 1.92286 | v7 = 21.3 |
| r13 = | −65.282 | d13 = | Variable | | |
| r14 = | −535.129 | d14 = | 6.13 | n8 = 1.48749 | v8 = 70.2 |
| r15 = | −50.924 | d15 = | 0.21 | | |
| r16 = | 263.617 | d16 = | 8.55 | n9 = 1.64000 | v9 = 60.1 |
| r17 = | −47.422 | d17 = | 1.65 | n10 = 1.80518 | v10 = 25.4 |
| r18 = | −147.421 | d18 = | 0.21 | | |
| r19 = | 53.825 | d19 = | 7.03 | n11 = 1.48749 | v11 = 70.2 |
| r20 = | −646.250 | d20 = | Variable | | |
| r21 = | 0.000 (Stop) | d21 = | 5.99 | | |
| r22 = | −32.115 | d22 = | 0.96 | n12 = 1.65160 | v12 = 58.5 |
| r23 = | 34.056 | d23 = | 2.12 | n13 = 1.69895 | v13 = 30.1 |
| r24 = | 48.730 | d24 = | 8.83 | | |
| r25 = | −28.631 | d25 = | 1.03 | n14 = 1.64000 | v14 = 60.1 |
| r26 = | −363.738 | d26 = | 5.73 | n15 = 1.68893 | v15 = 31.1 |
| r27 = | −25.491 | d27 = | 26.00 | | |
| r28 = | 178.578 | d28 = | 6.86 | n16 = 1.48749 | v16 = 70.2 |
| r29 = | −30.144 | d29 = | 1.51 | n17 = 1.75520 | v17 = 27.5 |
| r30 = | −38.170 | d30 = | 1.99 | | |
| r31 = | 134.974 | d31 = | 1.31 | n18 = 1.75520 | v18 = 27.5 |
| r32 = | 27.786 | d32 = | 5.89 | n19 = 1.51118 | v19 = 51.0 |
| r33 = | −226.031 | d33 = | 0.19 | | |
| r34 = | 36.742 | d34 = | 3.60 | n20 = 1.48749 | v20 = 70.2 |
| r35 = | 163.132 | d35 = | 5.70 | | |
| r36 = | 0.000 | d36 = | 47.57 | n21 = 1.51633 | v21 = 64.2 |
| r37 = | 0.000 | | | | |

| Focal Length Variable Distance | 11.28 | 169.21 |
|---|---|---|
| d6 | 1.68 | 71.22 |
| d13 | 110.05 | 2.07 |
| d20 | 2.05 | 40.49 |

TABLE 2 f = 8.20 Fno = 1: 1.6~1.3 IMAGE SIZE φ 8

| | | | | | | |
|---|---|---|---|---|---|---|
| r1 = | 201.367 | d1 = | 3.09 | n1 = 1.68893 | v1 = 31.1 |
| r2 = | 79.603 | d2 = | 1.65 | | |
| r3 = | 81.681 | d3 = | 18.99 | n2 = 1.48749 | v2 = 70.2 |
| r4 = | −434.228 | d4 = | 0.21 | | |
| r5 = | 79.677 | d5 = | 14.09 | n3 = 1.51633 | v3 = 64.2 |
| r6 = | 581.252 | d6 = | Variable | | |

TABLE 2-continued f = 8.20 Fno = 1: 1.6~1.3 IMAGE SIZE φ 8

| r7 = | 70.957 | | d7 = | 1.65 | n4 = 1.77250 | v4 = 49.6 |
|---|---|---|---|---|---|---|
| r8 = | 29.208 | | d8 = | 6.76 | | |
| r9 = | −2104.508 | | d9 = | 1.51 | n5 = 1.77250 | v5 = 49.6 |
| r10 = | 59.821 | | d10 = | 8.57 | | |
| r11 = | −32.422 | | d11 = | 1.51 | n6 = 1.77250 | v6 = 49.6 |
| r12 = | 345.764 | | d12 = | 4.32 | n7 = 1.92286 | v7 = 21.3 |
| r13 = | −65.282 | | d13 = | Variable | | |
| r14 = | −535.129 | | d14 = | 6.13 | n8 = 1.48749 | v8 = 70.2 |
| r15 = | −50.924 | | d15 = | 0.21 | | |
| r16 = | 263.617 | | d16 = | 8.55 | n9 = 1.64000 | v9 = 60.1 |
| r17 = | −47.422 | | d17 = | 1.65 | n10 = 1.80518 | v10 = 25.4 |
| r18 = | −147.421 | | d18 = | 0.21 | | |
| r19 = | 53.825 | | d19 = | 7.03 | n11 = 1.48749 | v11 = 70.2 |
| r20 = | −646.250 | | d20 = | Variable | | |
| r21 = | 0.000 | (Stop) | d21 = | 5.99 | | |
| r22 = | −32.115 | | d22 = | 0.96 | n12 = 1.65160 | v12 = 58.5 |
| r23 = | 34.056 | | d23 = | 2.12 | n13 = 1.69895 | v13 = 30.1 |
| r24 = | 48.730 | | d24 = | 8.83 | | |
| r25 = | −28.631 | | d25 = | 1.03 | n14 = 1.64000 | v14 = 60.1 |
| r26 = | −363.738 | | d26 = | 6.73 | n15 = 1.68893 | v15 = 31.1 |
| r27 = | −25.491 | | d27 = | 5.84 | | |
| r28 = | −17.802 | | d28 = | 1.40 | n16 = 1.83481 | v16 = 42.7 |
| r29 = | 57.415 | | d29 = | 7.48 | n17 = 1.67270 | v17 = 32.1 |
| r30 = | −36.633 | | d30 = | 1.94 | | |
| r31 = | −164.025 | | d31 = | 5.02 | n18 = 1.72600 | v18 = 53.6 |
| r32 = | −33.062 | | d32 = | 4.32 | | |
| r33 = | 178.678 | | d33 = | 6.86 | n19 = 1.48749 | v19 = 70.2 |
| r34 = | −30.144 | | d34 = | 1.51 | n20 = 1.75520 | v20 = 27.5 |
| r35 = | −38.170 | | d35 = | 1.99 | | |
| r36 = | 134.974 | | d36 = | 1.31 | n21 = 1.75520 | v21 = 27.5 |
| r37 = | 27.786 | | d37 = | 5.89 | n22 = 1.51118 | v22 = 51.0 |
| r38 = | −226.031 | | d38 = | 0.19 | | |
| r39 = | 36.742 | | d39 = | 3.60 | n23 = 1.48749 | v23 = 70.2 |
| r40 = | 163.132 | | d40 = | 5.70 | | |
| r41 = | 0.000 | | d41 = | 47.57 | n24 = 1.51633 | v24 = 64.2 |
| r42 = | 0.000 | | | | | |

| Focal Length Variable Distance | 8.22 | 123.27 |
|---|---|---|
| d6 | 1.68 | 71.22 |
| d13 | 110.05 | 2.07 |
| d20 | 2.05 | 40.49 |

Table 3 lists the values of the Expressions (1) and (2) at the wide-angle end of the above numerical examples.

To obtain the direction determination signal for autofocusing at the imaging surface, it is necessary to shift the back focus by a suitable amount by wobbling. For this, on the one hand, the image-forming position should be shifted with a suitable amplitude that is possible to determine a direction as the system and a peak in video signal, in order to detect gradients in the video signal more accurately, but on the other hand, the amplitude should be restricted, so that the image on the output surface does not become blurry due to the amplitude driving of the wobbling lens unit. Here, the wobbling amplitude is set such that the back focus shifts by ¼ at one half of the amplitude of the wobbling lens unit. For example, for a ⅔-type camera which is ordinarily used for broadcasting (image size: φ11.0), when the diameter of the permissible circle of confusion is about 0.021 mm and the F number is F/1.6, a quarter of the depth of focus is about 0.017 mm. These values depend on the size and the performance of the image-taking element. For example, for a ½-type camera (image size: φ8.0), the diameter of the permissible circle of confusion is about 0.016 mm.

Here, as a case in which the effective F number is confined by the light amount adjustment stop regardless of whether the auxiliary lens system is inserted or not, the effective F number FNO when the auxiliary lens system is not inserted is set to F/4.0. Moreover, as a case in which the effective F number is not confined by the light amount adjustment stop when the auxiliary lens system is inserted, but confined by the member M holding the lenses, the effective F number FNO when the auxiliary lens system is not inserted is set to F/1.6.

Moreover, in Numerical Example 1 when the auxiliary lens system is not inserted, the sensitivity of the wobbling lens unit 41 with respect to the image-forming position in the optical axis direction (an image-forming position of the wobbling lens unit 41) changes 0.42 in an absolute value when the wobbling lens unit 41 is driven at one (step) in the optical axis direction in the case where the wobbling lens unit 41 is arranged in the object side than the auxiliary lens system. When the wobbling lens unit 41 is driven at one (step) in the optical axis direction in the case where the wobbling lens unit 41 is arranged in the image side than the auxiliary lens system, the image-forming position of the wobbling lens unit changes 0.30 in an absolute value. For example, when changing the image-forming position 0.042 mm in the optical axis direction, in the case where the wobbling lens unit 42 is arranged in the object side than the auxiliary lens system, the wobbling lens unit should be moved 0.10 mm, in the case where the wobbling lens unit 41 is arranged in the image side than the auxiliary lens system, the wobbling lens unit should be moved 0.14 mm.

TABLE 3

If the effective F number is confined by the light amount adjustment stop when the auxiliary lens system is inserted

| | wobbling lens unit is provided to object side of auxiliary lens system (Expression 1) | | wobbling lens unit is provided to image side of auxiliary lens system (Expression 2) | |
|---|---|---|---|---|
| | Numerical Ex. 1 (not inserted) | Numerical Ex. 2 (inserted) | Numerical Ex. 1 (not inserted) | Numerical Ex. 2 (inserted) |
| diameter of permissible circle of confusion σ | 0.021 | 0.021 | 0.021 | 0.021 |
| change factor δ | ↳ | x1 | ↲ | ↳ | x1 | ↲ |
| effective F number FNO | F/4.0 | | F/2.9 | F/4.0 | | F/2.9 |
| change factor F | ↳ | x0.73 | ↳ | ↳ | x0.73 | ↲ |
| focal length f | 11.28 | 8.20 | 11.28 | 8.20 |

TABLE 3-continued

If the effective F number is confined by the light amount adjustment stop when the auxiliary lens system is inserted

| | wobbling lens unit is provided to object side of auxiliary lens system (Expression 1) | | wobbling lens unit is provided to image side of auxiliary lens system (Expression 2) | |
|---|---|---|---|---|
| | Numerical Ex. 1 (not inserted) | Numerical Ex. 2 (inserted) | Numerical Ex. 1 (not inserted) | Numerical Ex. 2 (inserted) |
| shift factor K | ↳ x0.73 | ↲ | ↳ x0.73 | ↲ |
| ¼ of depth of focus | 0.042 | 0.031 | 0.042 | 0.031 |
| half amplitude of wobbling lens unit | 0.10 | 0.14 | 0.14 | 0.10 |
| all expressions | ↳ x1.37 | ↲ | ↳ x0.73 | ↲ |
| diameter of permissible circle of confusion σ | 0.021 | 0.021 | 0.021 | 0.021 |
| change factor δ | ↳ x1 | ↲ | ↳ x1 | ↲ |
| effective F number FNO | F/1.6 | F/1.6 | F/1.6 | F/1.6 |
| change factor F | ↳ x1 | ↲ | ↳ x1 | ↲ |
| focal length f | 11.28 | 8.20 | 11.28 | 8.20 |
| shift factor K | ↳ x0.73 | ↲ | ↳ x0.73 | ↲ |
| ¼ of depth of focus | 0.017 | 0.017 | 0.017 | 0.017 |
| half amplitude of wobbling lens unit | 0.04 | 0.08 | 0.06 | 0.06 |
| all expressions | ↳ x1.88 | ↲ | ↳ x1 | ↲ |

Thus, by letting an optical system which in dependently includes a wobbling lens unit and a freely insertable auxiliary lens system further on the image side than the light amount adjustment stop satisfy the Expressions (1) and (2), it is possible to realize an image-taking lens system, with which the best image-forming position can be detected accurately regardless of whether the auxiliary lens system is inserted or not, and wherein blurring of the image on the output screen cannot be perceived during wobbling.

Figure 4:
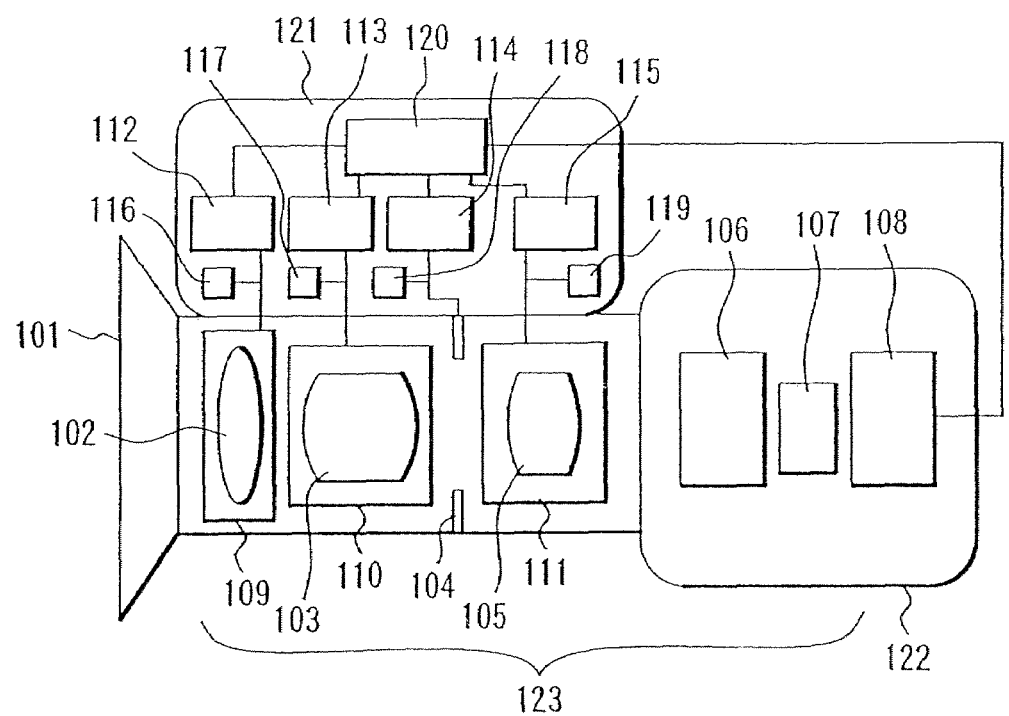
FIG. 4 is a schematic diagram of an image-taking system using the zoom lens of the Numerical Example 1 or 2 as an image-taking lens.
Figure 5A:
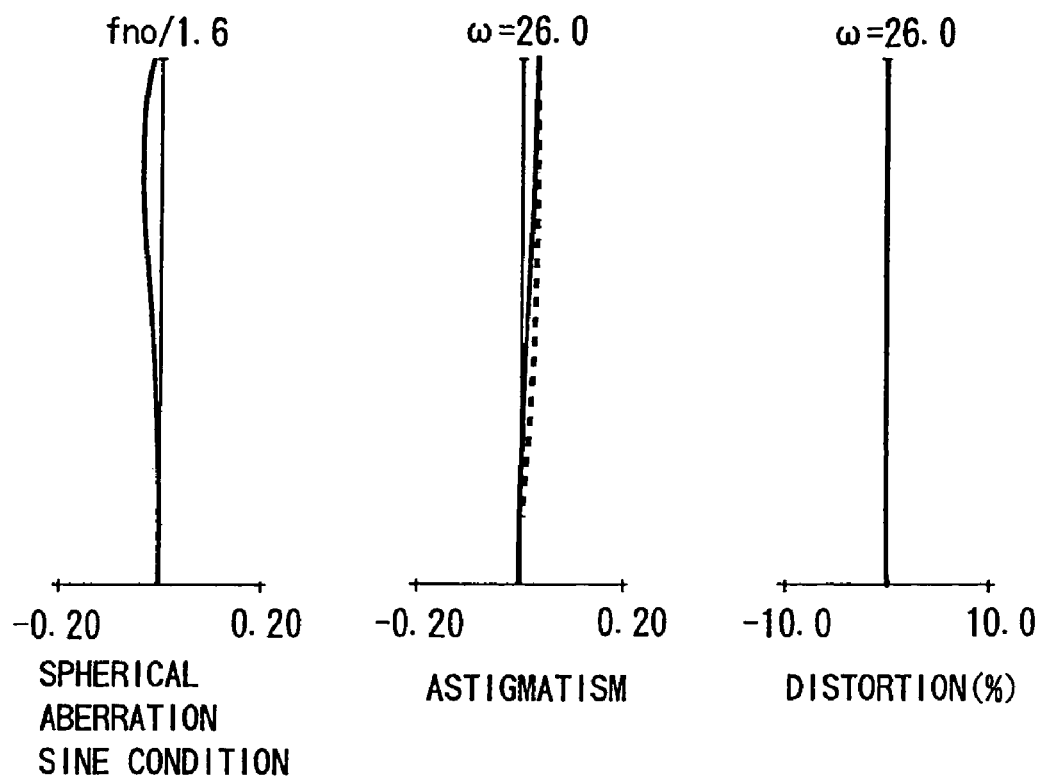
FIGS. 5A and 5B show aberration charts for the zoom lens according to Numerical Example 1 of the present invention.
Figure 5B:
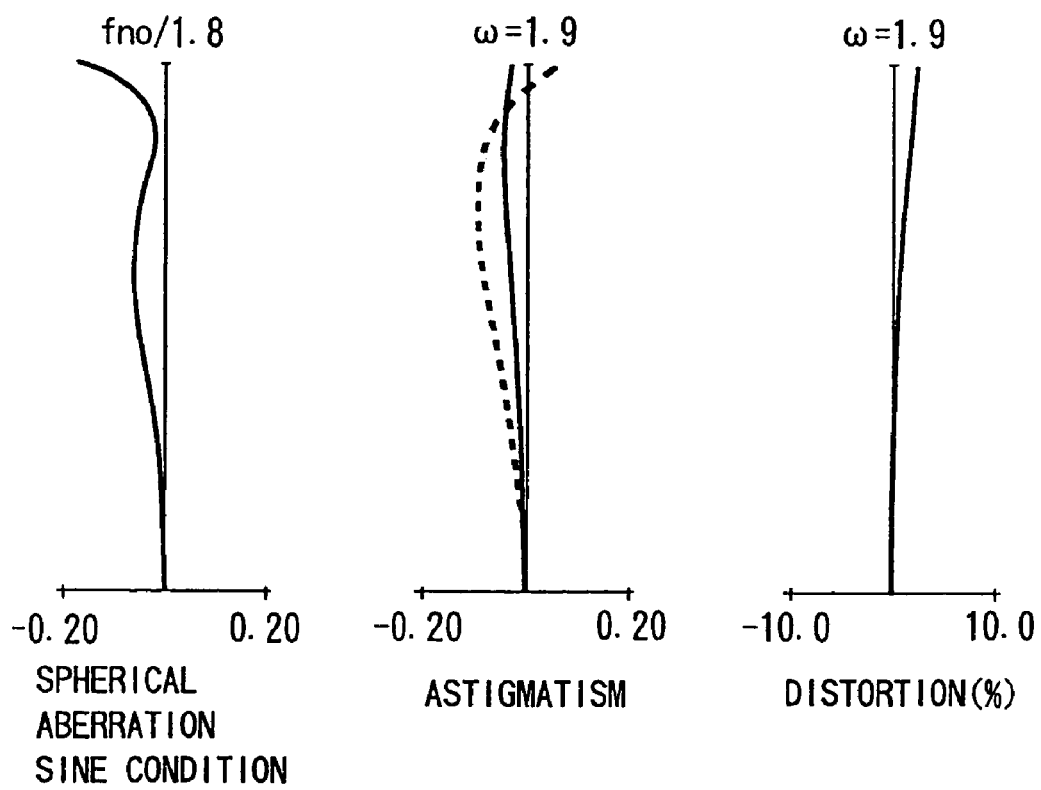
Figure 6A:
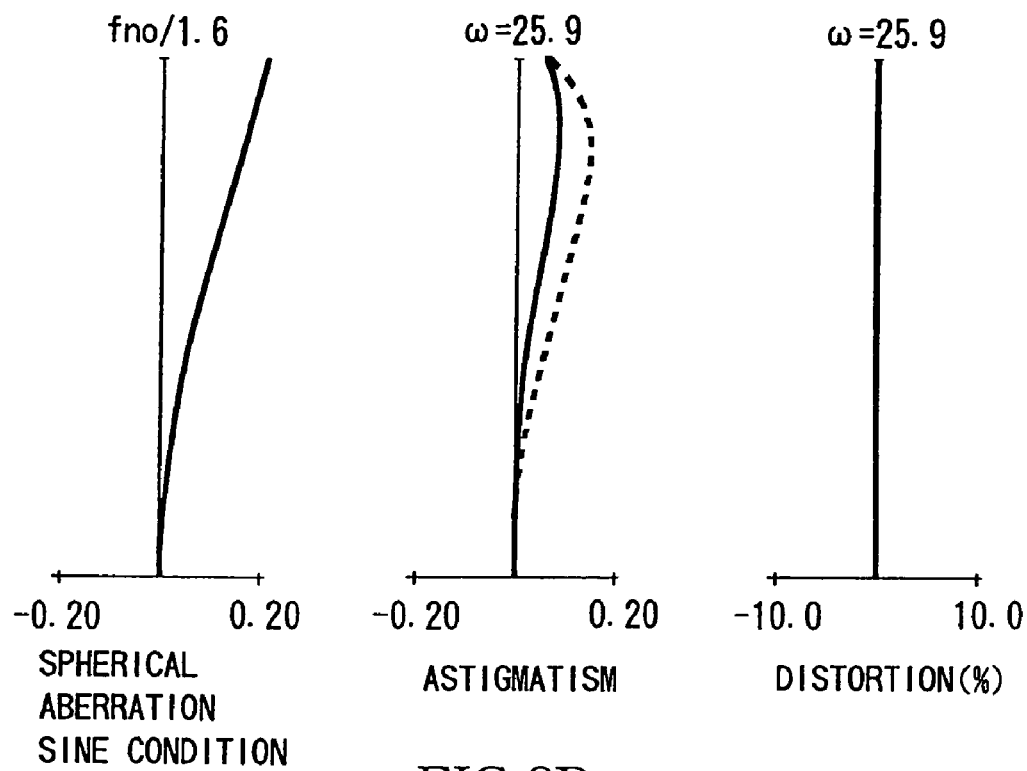
FIGS. 6A and 6B show aberration charts for the zoom lens according to Numerical Example 2 of the present invention.
Figure 6B:
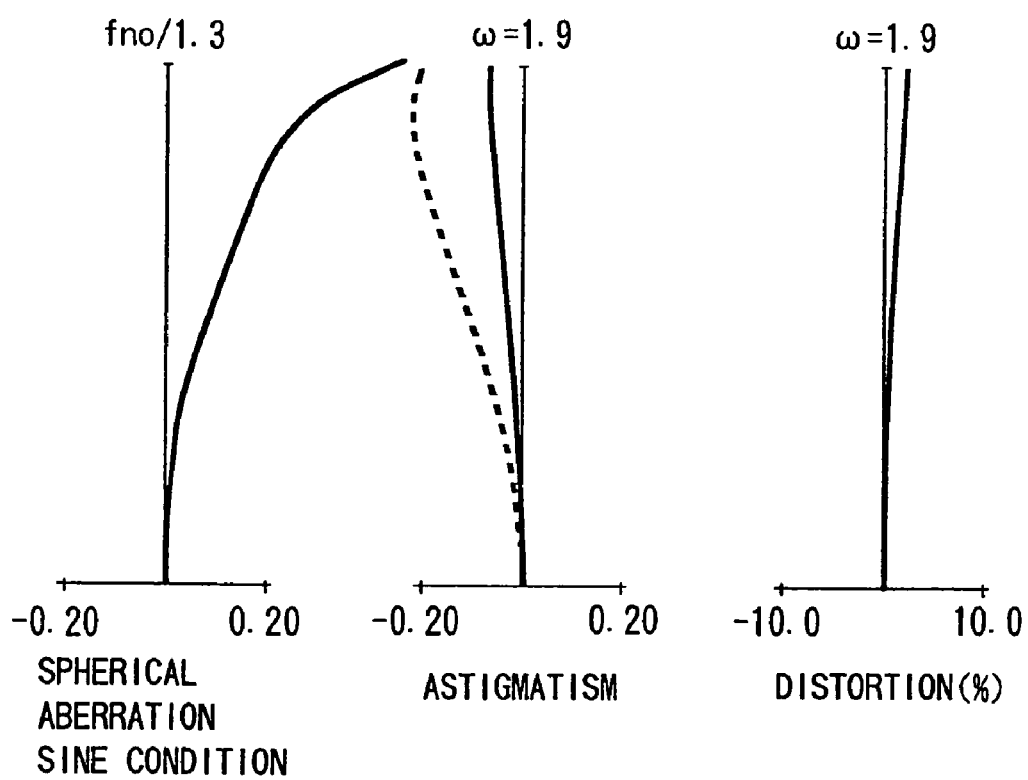

Next, an image-taking system (TV camera system) using the zoom lens of the Numerical Example 1 or 2 as an image-taking lens is explained with reference to FIG. 4. In FIG. 4, reference numeral 122 denotes a camera, such as a TV camera or video camera, reference numeral 101 denotes a zoom lens according to Numerical. Example 1 or 2, which can be mounted on the camera 122. Reference numeral 121 denotes a drive unit (control device) provided to the zoom lens 101. The zoom lens 101 and the drive unit 121 together constitute a zoom lens system. Reference numeral 123 denotes an image-taking system.

In the zoom lens 101, reference numeral 102 denotes a lens unit for focusing, reference numeral 103 denotes a lens unit which can be moved during zooming, reference numeral 104 denotes a light amount adjustment stop, and reference numeral 105 denotes a lens unit performing an image-forming action, which includes a freely insertable auxiliary lens unit as well as a wobbling lens unit.

Reference numerals 109, 110 and 111 denote driving mechanisms, such as cams or feed screws, for driving the individual lens units 102, 103 and 105 in the optical axis direction. The driving mechanisms 109, 110 and 111 can be electrically driven by a drive unit 121, but can also be driven manually.

Moreover, reference numerals 112 to 115 denote motors for driving the lens units 102, 103 and 105 as well as the light amount adjustment stop 104.

Moreover, reference numerals 116 to 119 denote position detectors, such as encoders, potentiometers or photosensors, for detecting the positions of the lens units 102, 103 and 105 and of the light amount adjustment stop 104.

Reference numeral 106 denotes a glass block, such as a filter or a color separation prism, and reference numeral 107 denotes an image-taking element, such as a CCD or CMOS sensor, which receives the object image light formed by the zoom lens 101.

Moreover, reference numerals 108 and 120 denote CPUs controlling the camera and the lens system.

Thus, by applying the image-taking lens of the Numerical Example 1 or 2 to an image-taking system such as a TV camera or the like, it is possible to realize an image-taking system with which the wobbling driving mechanism can be simplified, with which the optimum image-forming position can be detected accurately, and without blurring of the image on the output screen during wobbling.

With the present invention, it is possible to realize an image-taking lens system and an image-taking system with which the optimum image-forming position can be detected accurately regardless of whether the auxiliary lens system is inserted or not, and without blurring of the image on the output screen during wobbling.

As many apparently widely different embodiments of the present invention can be made without departing from the spirit and scope thereof, it is to be understood that the invention is not limited to the specific embodiments thereof except as defined in the claims.

While preferred embodiments have been described, it is to be understood that modification and variation of the present invention may be made without departing from the scope of the following claims.

"This application claims priority from Japanese Patent Application No. 2003-375037 filed on Nov. 4, 2003, which is hereby incorporated by reference herein."

What is claimed is:

1. An image-taking lens system comprising:
a relay lens unit having an image-forming action;
a wobbling lens unit arranged within the relay lens unit, the wobbling lens unit being driven by an amplitude in an optical axis direction; and
an auxiliary lens system which can be inserted into and removed from the relay lens unit, the auxiliary lens system shifting a focal length of the overall image-taking lens system,
wherein an amplitude amount of the wobbling lens unit is set on the basis of a state regarding whether the auxiliary lens system is inserted or removed, and
wherein the wobbling lens unit is arranged further to the object side than the auxiliary lens system, and the amplitude amount of the wobbling lens unit satisfies the following expression:

$$W_{IN} = \frac{\delta \cdot F}{K^2} W_{OUT}$$

where
$\delta$: a change magnification of diameter of permissible circle of confusion when exchanging a main body of an image-taking apparatus;
F: a change magnification of effective F number when the auxiliary lens system is inserted or removed;
K: a shift magnification of focal length when the auxiliary lens system is inserted or removed;
$W_{IN}$: an amplitude of wobbling lens unit when the auxiliary lens system is inserted; and
$W_{OUT}$: an amplitude of wobbling lens unit when the auxiliary lens system is removed.

2. The image-taking lens system according to claim 1, wherein an influence of a change of the effective F number resulting from an insertion and removal of the auxiliary lens system is reduced.

3. The image-taking lens system according to claim 1, further comprising a light amount adjustment stop arranged further to an object side than the relay lens unit.

4. The image-taking lens system according to claim 3, wherein, in order from an object side, a first lens unit, a second lens unit which can be moved during zooming, and a third lens unit correcting a movement of an image-forming position during zooming are arranged further to the object side than the light amount adjustment stop.

5. An image-taking system comprising:
an image-taking apparatus; and
the image-taking lens system according to claim 1, which is mounted on the image-taking apparatus.

6. An image-taking lens system comprising;
a relay lens unit having an image-forming action;
a wobbling lens unit arranged within the relay lens unit, the wobbling lens unit being driven by an amplitude in an optical axis direction; and
an auxiliary lens system which can be inserted into and removed from the relay lens unit, the auxiliary lens system shifting a focal length of the overall image-taking lens system,
wherein an amplitude amount of the wobbling lens unit is set on the basis of a state regarding whether the auxiliary lens system is inserted or removed, and
wherein the wobbling lens unit is arranged further to the image side than the auxiliary lens system, and the amplitude amount of the wobbling lens unit satisfies the following expression;

$$W_{IN} = \delta \cdot F \cdot W_{OUT}$$

where
$\delta$: a change magnification of diameter of permissible circle of confusion when exchanging a main body of an image-taking apparatus;
F: a change magnification of effective F number when the auxiliary lens system is inserted or removed;
$W_{IN}$: an amplitude of wobbling lens unit when the auxiliary lens system is inserted; and
$W_{OUT}$: an amplitude of wobbling lens unit when the auxiliary lens system is removed.

7. The image-taking lens system according to claim 6, wherein an influence of a change of the effective F number resulting from an insertion and removal of the auxiliary lens system is reduced.

8. The image-taking lens system according to claim 6, further comprising a light amount adjustment stop arranged further to an object side than the relay lens unit.

9. The image-taking lens system according to claim 8, wherein, in order from an object side, a first lens unit, a second lens unit which can be moved during zooming, and a third lens unit correcting a movement of an image-forming position during zooming are arranged further to the object side than the light amount adjustment stop.

10. An image-taking system comprising:
an image-taking apparatus; and
the image-taking lens system according to claim 6, which is mounted on the image-taking apparatus.

* * * * *

UNITED STATES PATENT AND TRADEMARK OFFICE
CERTIFICATE OF CORRECTION

PATENT NO. : 7,423,687 B2
APPLICATION NO. : 10/976854
DATED : September 9, 2008
INVENTOR(S) : Shinichiro Yakita et al.

It is certified that error appears in the above-identified patent and that said Letters Patent is hereby corrected as shown below:

COLUMN 8:
Line 65, "x0.73  " should read --x0.73  --.

COLUMN 9:
Line 32, "in independently" should read --independently--.
Line 47, "Numerical." should read --Numerical--.

Signed and Sealed this

Seventeenth Day of February, 2009

JOHN DOLL
*Acting Director of the United States Patent and Trademark Office*